(12) United States Patent
Taylor et al.

(10) Patent No.: US 8,972,876 B2
(45) Date of Patent: Mar. 3, 2015

(54) CUSTOMER RELATIONSHIP MANAGEMENT SYSTEM AND METHOD

(75) Inventors: Jacob Taylor, Santa Clara, CA (US); John Roberts, San Jose, CA (US); Clinton Oram, San Mateo, CA (US); Ajay Gupta, Cupertino, CA (US); Majed Itani, San Jose, CA (US); Sadek Baroudi, San Jose, CA (US); Roger Smith, Apex, NC (US)

(73) Assignee: Sugarcrm Inc., Cupertino, CA (US)

( * ) Notice: Subject to any disclaimer, the term of this patent is extended or adjusted under 35 U.S.C. 154(b) by 1806 days.

(21) Appl. No.: 11/807,704

(22) Filed: May 29, 2007

(65) Prior Publication Data

US 2007/0283287 A1    Dec. 6, 2007

Related U.S. Application Data

(60) Provisional application No. 60/808,822, filed on May 26, 2006.

(51) Int. Cl.
*G06F 3/00* (2006.01)
*G06F 9/00* (2006.01)
*G06F 17/00* (2006.01)
*G06Q 30/06* (2012.01)

(52) U.S. Cl.
CPC ................................ *G06Q 30/06* (2013.01)
USPC ........... 715/764; 715/763; 715/769; 715/853; 715/762

(58) Field of Classification Search
CPC ............ G06F 3/0482; G06F 17/30554; G06F 17/30595; G06F 3/04847
USPC .......................... 715/764, 763, 769, 853, 762
See application file for complete search history.

(56) References Cited

U.S. PATENT DOCUMENTS

| | | |
|---|---|---|
| 5,680,611 A | 10/1997 | Rail et al. |
| 5,956,736 A | 9/1999 | Hanson et al. |
| 6,453,233 B1 | 9/2002 | Kato |
| 6,832,248 B1 * | 12/2004 | Byrnes .......................... 709/223 |

OTHER PUBLICATIONS

PCT/US07/12704 International Search Report, dated Oct. 10, 2008.
PCT/US07/12704 Written Opinion, dated Oct. 10, 2008.

* cited by examiner

*Primary Examiner* — Boris Pesin
*Assistant Examiner* — Sabrina Greene
(74) *Attorney, Agent, or Firm* — Steven Greenberg; CRGO Law (57) ABSTRACT

A software-based customer relationship management system and method.

4 Claims, 9 Drawing Sheets

MY FORECASTS

FISCAL YEAR 2006 ▼ (2005-12-31 TO 2006-12-30)

WORKSHEET

| MY DIRECT FORECAST: | |
|---|---|
| LAST COMMIT DATE: | LAST COMMIT AMOUNT (BEST CASE): |
| LAST COMMIT AMOUNT (LIKELY CASE): | LAST COMMIT AMOUNT (WORST CASE): |
| OPPORTUNITY COUNT: 0 | WEIGHTED AMOUNT: 0 |
| COMMIT AMOUNT (BEST CASE): | COMMIT AMOUNT (LIKELY CASE): [COMMIT] |
| | COMMIT AMOUNT (WORST CASE): |

WORKSHEET

| MY GROUP FORECAST: | |
|---|---|
| LAST COMMIT DATE: | LAST COMMIT AMOUNT (BEST CASE): |
| LAST COMMIT AMOUNT (LIKELY CASE): | LAST COMMIT AMOUNT (WORST CASE): |
| OPPORTUNITY COUNT: 0 | WEIGHTED AMOUNT: 0 |
| ROLLUP COMMIT AMOUNT (BEST CASE): 0 | ROLLUP COMMIT AMOUNT (LIKELY CASE): 0 |
| ROLLUP COMMIT AMOUNT (WORST CASE): 0 | |
| COMMIT AMOUNT (BEST CASE): | COMMIT AMOUNT (LIKELY CASE): [COMMIT] |
| | COMMIT AMOUNT (WORST CASE): |

CUSTOMER RELATIONSHIP MANAGEMENT SYSTEM AND METHOD

PRIORITY CLAIM

This application claims priority under 35 USC 119(e) to U.S. Provisional Patent Application Ser. No. 60/808,822 filed on May 26, 2006 and entitled "Customer Relationship Management System and Method" which is incorporated herein by reference.

FIELD

The system and method relates generally to a business software system and method and in particular to a software-based system and method for providing customer relationship management.

BACKGROUND

Customer relationship management (CRM) systems and solutions are well known. For example, typical known CRM systems include Microsoft® CRM, SalesForce, a CRM product provided by SalesForce.com, Netsuite CRM, and SAP Business One CRM. However, conventional CRM systems have significant limitations that include a lack of flexibility, high costs, and a closed-source structure which is embedded into the traditional product offerings. These limitations have led to a failure rate of over 70% with traditional CRM implementations. Thus, it is desirable to provide a customer relationship management system and method that overcomes these limitations of typical CRM systems.

BRIEF DESCRIPTION OF THE DRAWINGS

FIG. 6A illustrates an example of the user interface for a worksheet screen of the system;

DETAILED DESCRIPTION OF ONE OR MORE EMBODIMENTS

The system and method are particularly applicable to an open source customer relationship management software system and it is in this context that the system and method will be described. It will be appreciated, however, that the algorithms, data structures, processes and modules of the system and method have greater utility since these modules, algorithms, data structures and processes disclosed herein can be equally applied to other non-open source CRM systems, as well as other business software application systems as well as other database software systems. For purposes of illustration, the described system is an implementation in a customer relationship management (CRM) and groupware system. In the example below, the CRM and groupware system is the Sugar Enterprise version 4.5 commercially available from SugarCRM Inc.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
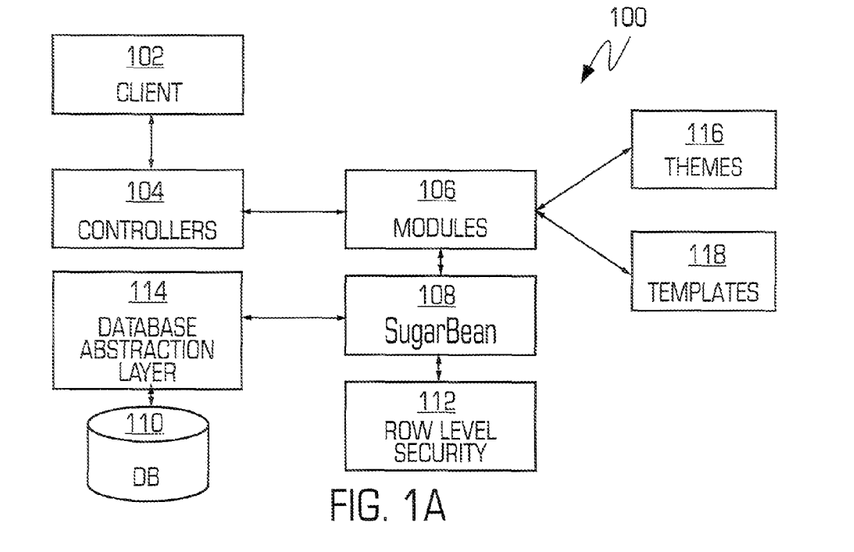
FIG. 1A is a diagram illustrating an implementation of a customer relationship management system that incorporates the various features of the system.
Figure 1B:
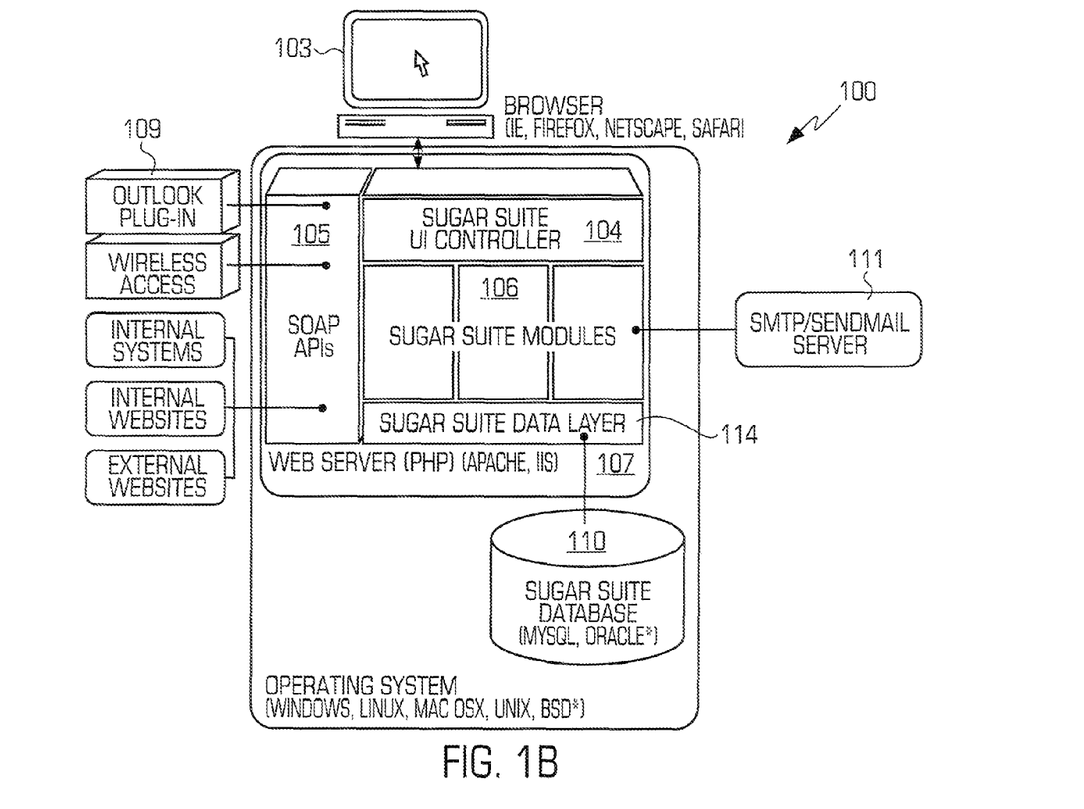
FIG. 1B illustrates more details of the customer relationship management system shown in FIG. 1A.

FIG. 1A is a diagram illustrating a customer relationship management (CRM) system 100 that is an example of a software-based business software application. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network 103 such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
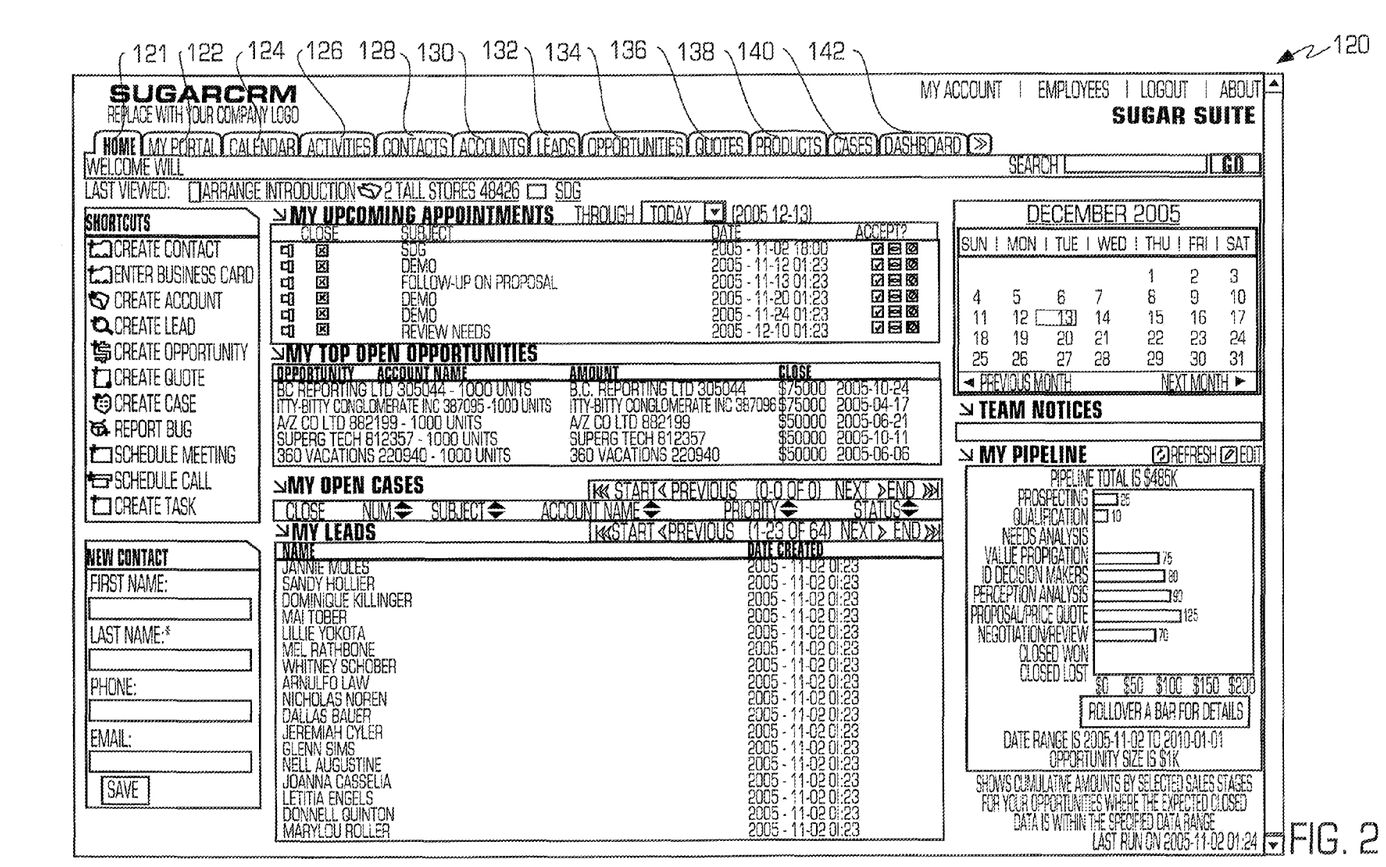
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with , for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard (such as that shown for example in FIG. 2B) module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and resubmit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®), that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol. Now, a process for dashboard customization that may be implemented in the system shown in FIGS. 1A and 1B as well as other business software systems is described.

Figure 3:
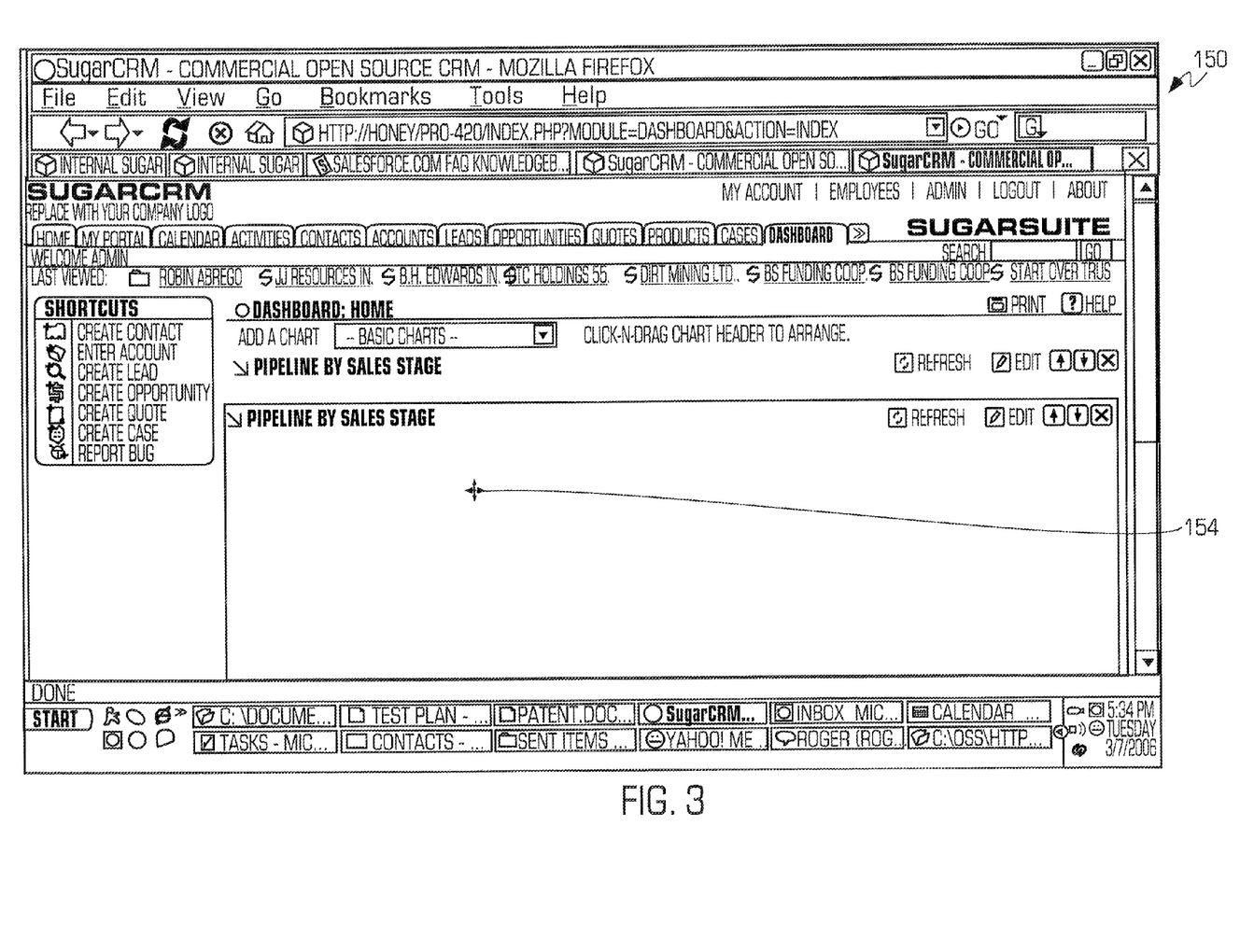
FIG. 3 illustrates an example of the dashboard user interface during the drag/drop process.
Figure 4:
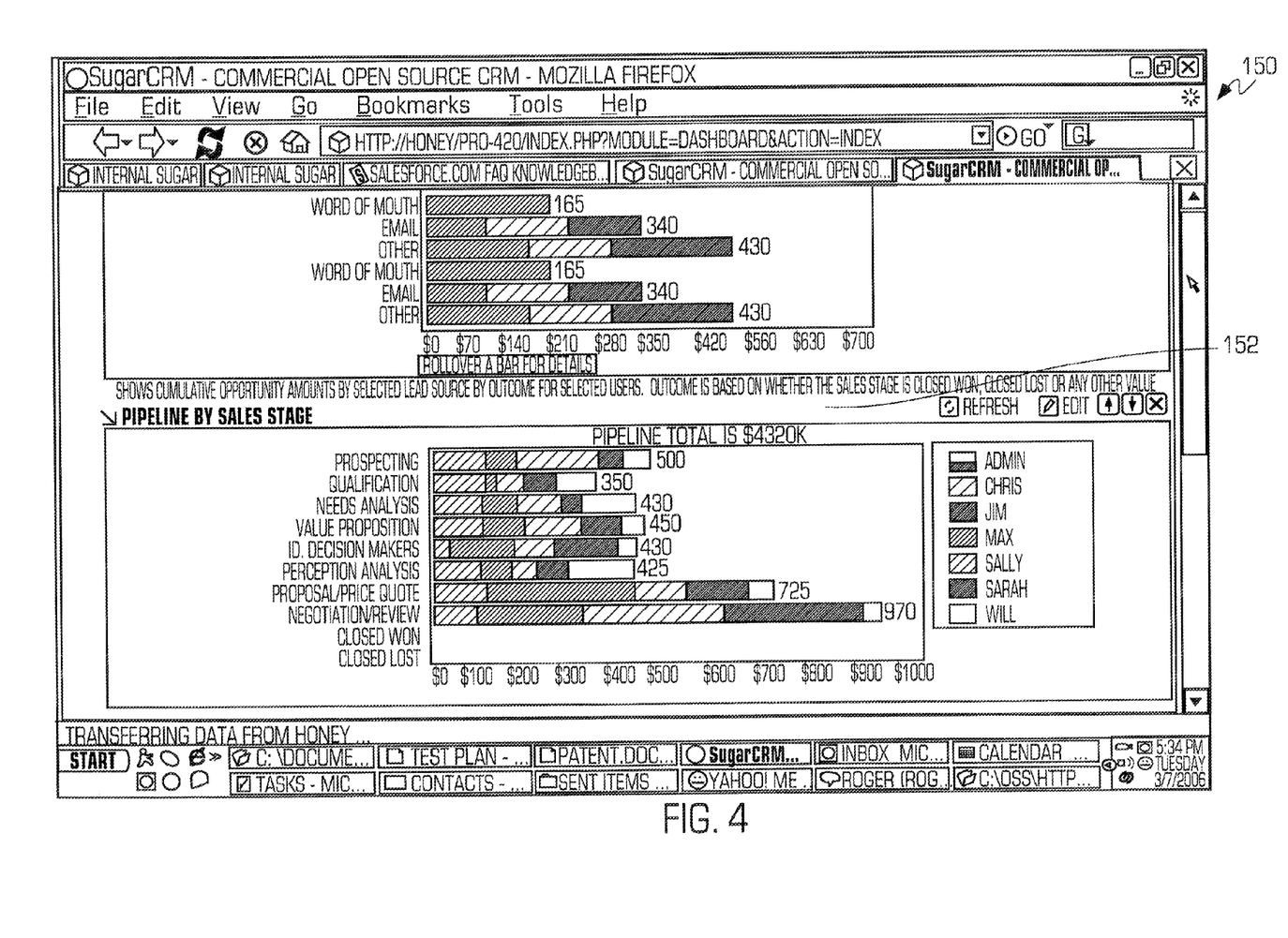
FIGS. 4 and 5 show the dashboard user interface when the drag/drop process has been completed.
Figure 5:
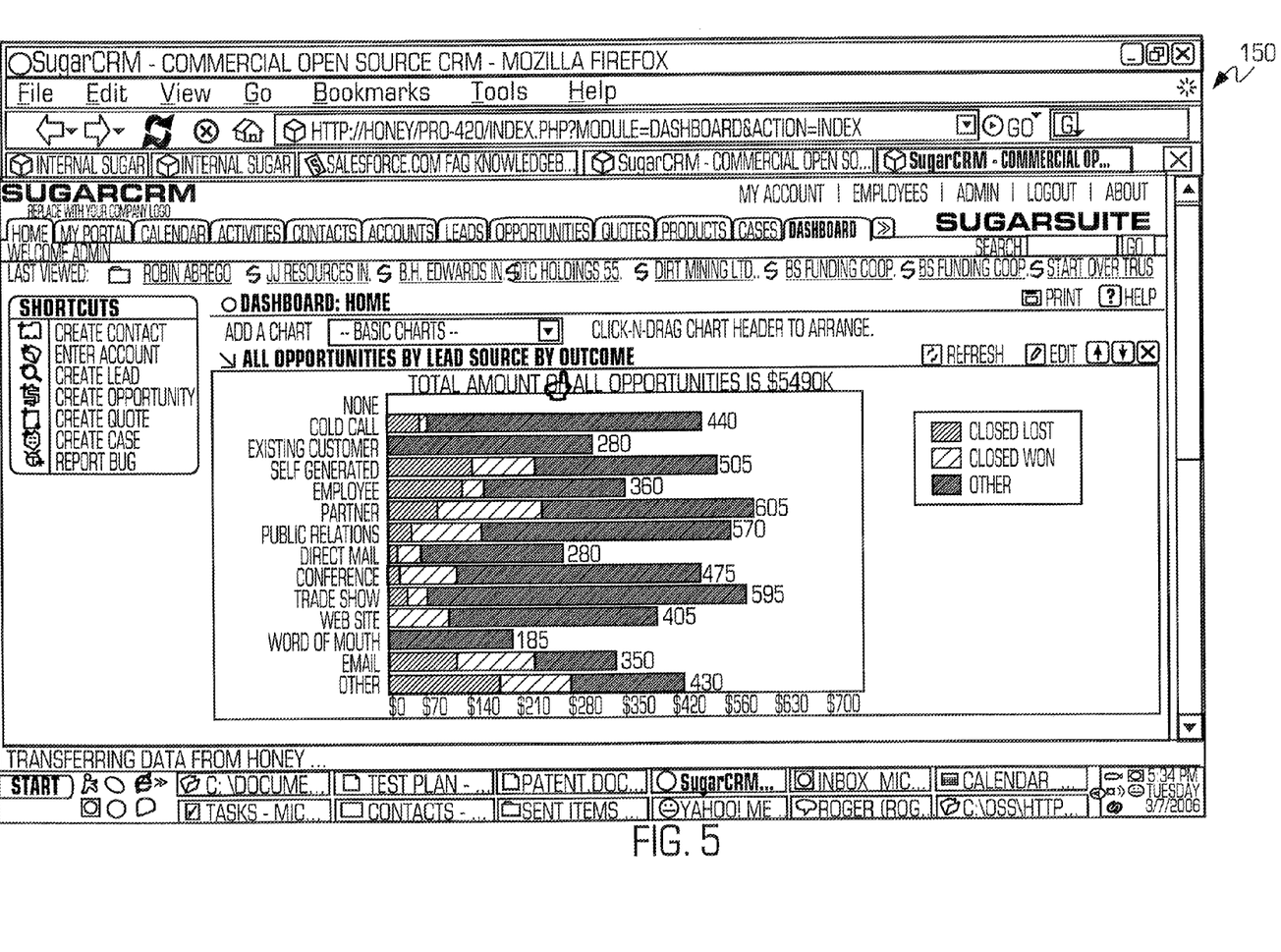

FIG. 3 illustrates an example of the user interface 150 during a drag/drop process wherein the cursor is now a positioning indicator 154 that permits the user to reposition a portion of the user interface of the application, in the example shown in FIG. 3 the portion is a pipeline by sales stage chart, using a drag-drop methodology so that the user can customize his/her user interface at any time. In one implementation, the drag and drop process is implemented as modular code that is added into the end user interface and server side code that can receive communications from the client side code to store configuration updates (transmissions between the client side code and the server may preferably leverage the JSON encoding format) and comprises a plurality of lines of computer code that implement the drag and drop process described below. In the example shown in FIG. 3, when the chart is positioned correctly, the user can release the mouse, ending the drag-drop operation and placing the chart into its new position (See FIG. 4) in the user interface and shuffling other charts accordingly. As shown in FIG. 5, the top position in the dashboard is now occupied by another chart as part of the reshuffling that occurs in response to the drag-drop procedure. The new layout is saved for the current user and is automatically used on future renderings of the dashboard tab.

While the initial implementation of this functionality allows rearranging of graphs on the dashboard, the functionality will also work for rearranging any objects visible on the screen on a per user basis or change the default layout for all users that have not yet customized their layout so that the user interface is user customizable. Example of objects that can be arranged using this approach include sub-panels, Home Screen Layout (FIG. 2 every section in the main portion of the screen: My Upcoming Appointments, My Top Open Opportunities, . . . Team Notices, My Pipeline, the Calendar) where the user can select the content as well as the location for each piece of content. Similar techniques have been integrated into the editor for the system to allow easier customization of the layout of the user interface (including all fields on all screens). The system may also permit the administrator to place a limit in the number of user interface components that a given user has on the screen at any given time.

For the sub-panel customization, the system permits the user to customize the ordering of the sub-panels (so that the user may be able to reorder the sub panels in any way) and the inclusion of certain sub panels under detail views. The reordering of the sub panels allows a user to place the sub panels they use most often in the best location for them to work. Then, sub panels that the user does not want to see may be hidden (collapsed), put into a bar, turned into an icon, or completely hidden from the user interface depending on the preference of the user. This sub panel customization may decrease the clutter of the user interface, but also decrease the amount of server side work, network bandwidth used, and client side work required to present the user interface to the client since the user interface for the hidden sub panels does not need to be generated, transmitted to the client, or rendered for presentation to the user.

The dashboard customization may also permit the user to create multiple tabs that contain components of user interface from other portions of the application where these components can be combined from different modules and may include but are not limited to: lists, graphs, pictures, blogs, notices, white boards, post boards, forums, note pads, videos, and sounds. In addition, an initial view presented to a user can be defined based on the role of the user in the system so that, for example, components of the user interface may be hidden based on user role or, if a user is not a member of the finance department, for instance, the particular user may not be able to view credit scores, credit history, and credit card information. The user interface editing studio (used by the administrator) may show the groups that can see which fields and it may also be able to present a preview of the UI as it will look to a particular user segment or user.

Figure 6:
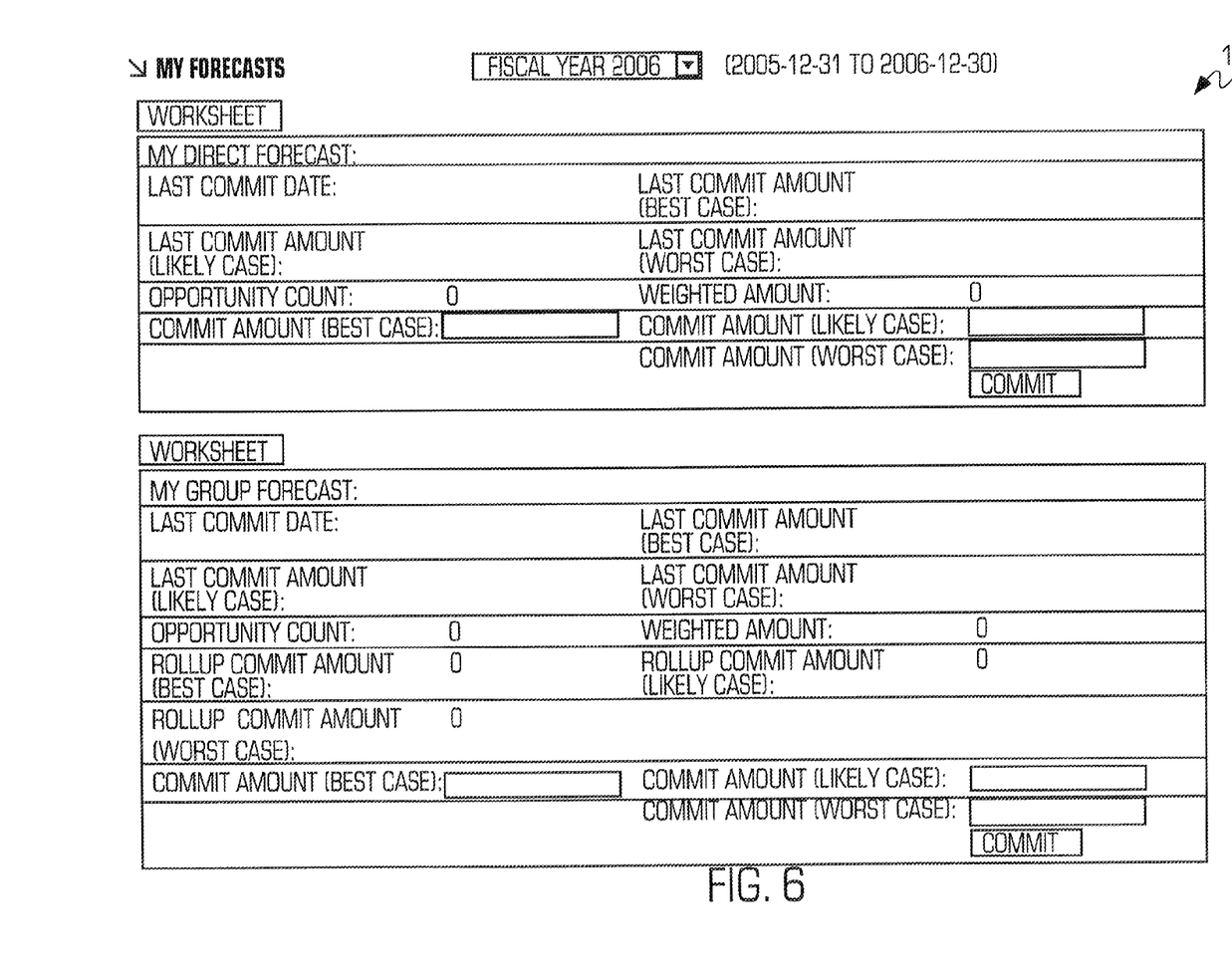
FIG. 6 illustrates an example of a forecasts home page user interface of the system shown in FIG. 1.

FIG. 6 illustrates an example of a forecasts home page user interface 160 of the system shown in FIG. 1. The forecasts home page is generated by the forecasts module described above and is implemented as a plurality of lines of computer code that are executed to implement the forecasting operations and functions described below. The functions of seeing, managing and updating the sales department quotas and pipelines of the sales is one of the more critical functions that an executive performs. The forecasts home page component 160 makes the process of setting, managing, and updating quotas and forecasts easier. In general, the time periods used for quotas and forecasting are dynamic and each time period can be composed of smaller time periods (years composed of quarters which are composed of months). The time periods are based on the business in question (fiscal quarters compared to calendar quarters) and can be customized in each installation. Multiple disjoint time periods are supported as well. Different forecasts may be built on independent time periods (different fiscal years for international operations or different levels of granularity for different supervisors).

Using the CRM system shown in FIG. 1, managers can, for example, assign quotas for any sales rep under them for any time period. As an example, a manager can set the Q3 2006 objective of a sales representative to one million dollars. Once a quota is assigned for a given time period, the sales representatives, their managers, and all people in the management chain (and support staff for those people) can see how well users are doing compared to their quota (assuming that the person has the appropriate privileges to view that information.) In addition, the user's opportunity pipeline can be compared against their quota and closed deals can be taking into account as absolutes. Deals that are in process can be weighted based on their expected probability to close in the given time period. An example of a report for fiscal year 2006 that shows a view of the user's forecast and the forecast of the group to which the user belongs is shown in FIG. 6 although the system is able to generate various other reports that are all within the scope of the system and method. Another example is a report that presents the user or team's quota, current forecast, current pipeline, and actual closed opportunities in the time period and this report gives a quick high level view of the current status of each member of the organization and the status of the quota and sales targets as a whole.

The system may also permit a user to analyze information based on the past performance of the sales representative and managers involved to help determine a more accurate projection of the expected income. This projection may use historic performance, seasonal performance, and/or external indicators (consumer confidence, analyst expectations, . . . ) to provide the projection.

When a user is managing their forecast (See FIG. 6), the user has the ability to commit from a high level and also drill into each deal. When the user sees the deals, the user can manually change their expected value arising from the deal. In addition to the manual efforts, the CRM system may also provide an estimated value based on past performance and current conditions (similar to pipeline projections, but applied to opportunities). The system may also provide real time advice to users as they project their forecasts.

When a manager is maintaining their forecast, they have a tree of worksheets available. The tree is a representation that allows the manager to skip around through their hierarchy and change expected/projected values for opportunities. If any external factors has changed since the estimate was created, the system can notify the user of those changes and allow them to accept the new change, provide a new override value (their estimate), or leave the current estimate. The tree of worksheets is an easily navigable tree that has the entire reporting hierarchy that the user is allowed to see. The manager can go to any individual or group and drill into the estimates and also override them. For either managers or users editing their forecast, the system may leverage additional server round trips to perform partial screen updates levering technologies such as AJAX to make modifications, update data, and perform navigation around the data without requiring a screen refresh to occur on the client side.

While tracking pipelines, the system can track and allow the user to edit/view the worst case, likely, and best case estimates of the pipeline as shown in FIG. 6. This information helps provide visibility into the performance of the company. Each user's pipeline can have rollup numbers that are calculated based on the cumulative values of each opportunity. FIG. 6A illustrates an example of a worksheet view where the user can edit the opportunities right in the worksheet views, or if they are a manager, can override the sales representatives values for the opportunities. The current pipeline and quota status can be viewed in reports, graphed, and exported to external systems and these options will be available for past, current, and future time periods.

The system may further include the ability to bookmark an item/object since, in a multi-user software environment, some items are more important than others. In particular, the system permits a user to flag one or more record(s) for monitoring and/or for easy reference later wherein the record may be flagged by including a field in a data record containing an indication of which items is bookmarked for which user or group of users. The server 107 can then track which items are bookmarked by each user and may also permit the user to be notified of any changes to that item (updates, more information, related activity, . . . ). The user interface of the system may provide each user with a shortcut mechanism for getting to their bookmarked items quickly. The shortcut mechanism may, for example, be an icon or menu on the screen, a page that shows a categorized list of bookmarked items, or any other mechanism for allowing users to select items. The system user interface may also include a user interface for monitoring and maintaining the bookmarks that allows users to remove bookmarks that they no longer needed, either individually, in bulk, and/or based on filter criteria.

Figure 7:
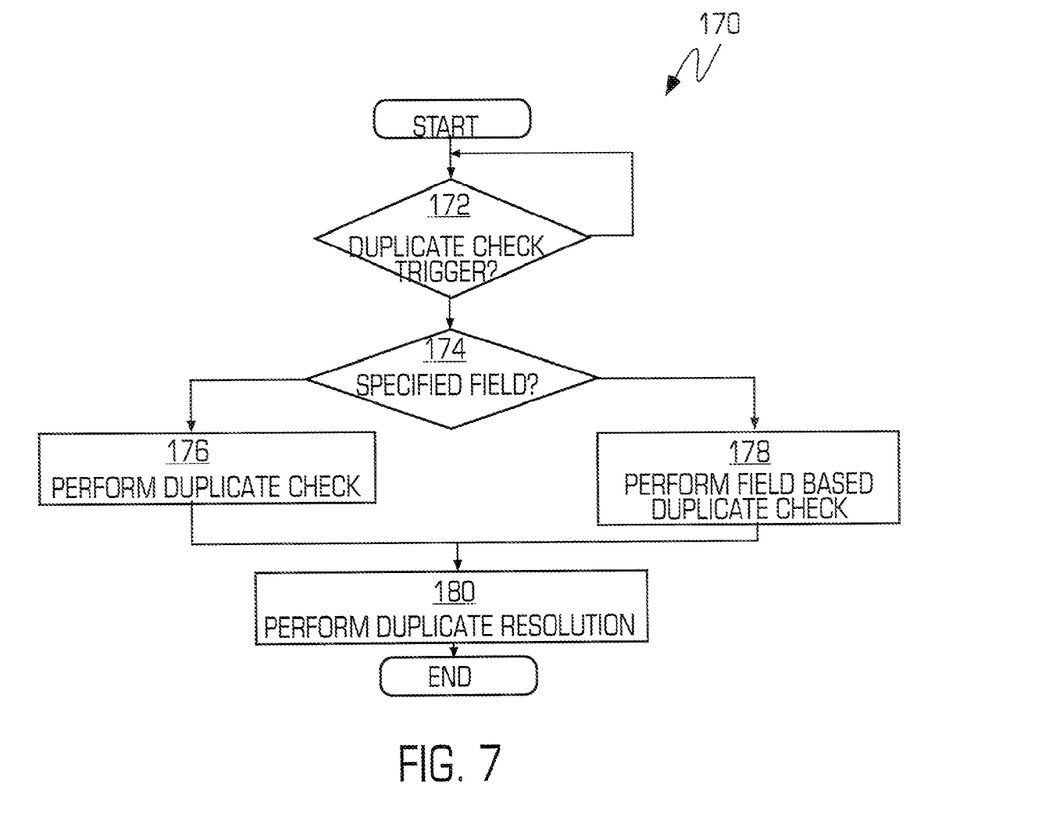
FIG. 7 illustrates a duplicate checking method.

FIG. 7 illustrates a duplicate checking method 170 since a common problem faced by companies leveraging CRM systems is that duplicate records invariably get entered into the system and it is desirable to be able to identify and remove those duplicate records. The duplicate tracking process may be implemented in the database (that incorporates a database management system) shown in FIGS. 1A and 1B may be implemented as a duplicate tracking module with a plurality of lines of computer code that are executed by a processor to implement the steps and operations of the duplicate tracking described below. In step 172, the system determines if a duplicate check trigger has occurred wherein the duplicate check trigger may be an import operation, on a periodic time interval and/or when data saves or updates have occurred. When the duplicate check trigger has occurred, the duplicate check process is performed. In addition, third party analysis and verification mechanisms may be leveraged (postal code lookup, address verification, etc.) during the duplication check process. One example of such a service that corrects for misspelled street names, interchanged ave/avenue/Avenue/ave., . . . or just using a like query in the database that ignores capitalization. In step 174, the system determines if one or more field(s) in a data record are specified by the user. If specific fields are not identified by the user, then in step 176, a typical duplicate check is performed. If the user does specify at least one field, then in step 178, the system performs a field based duplicate record check. For instance, if the user were validating a list of leads from a third party vendor and wanted to make sure that they did not get duplicates, they can look for duplications based on the email address and therefore have the system check for any contact records with duplicate email addresses. In step 180, when a duplicate is detected by the system, the system performs duplicate data record resolution. The system may permit various different duplicate data record resolutions including, for example, merging extra data, overriding data, a manual merge or rejecting the duplicate. For the merging the extra data, if the record being checked contains data that is not present in the current record, the data is merged into the existing data record. For the overriding data option, if the data record being checked contains data that is an update to the record that is currently in the system, the values in the new record should overwrite the values in the current record. In the manual merge, any errors are held for human review, and if an interactive import is in progress, the user can potentially manually merge the records right away. For the reject duplicate option, the system presumes that the current record should always take precedence over the record being checked and therefore does not allow the record being checked to be inserted into the database.

During the duplicate checking method, it is possible that the process cannot be completed immediately. So, if the user runs out of time or if the user's changes need to be audited, the duplicate handling can be logged for later review or the actual resolution is delayed until review has occurred, or the anticipated resolutions can be logged and then later implemented.

The duplicate checking mechanism can also be used to merge data updates from an external system. As long as there exists a mapping from the external system to the system that is importing the record, any records that have already been imported can be used to update the data which allows for exports from external systems to be used on a regular bases to replace the data which is a common occurrence when the system may not have the ability to directly integrate with another system.

The system may also provide periodic, scheduled duplicate record checks and validation checks and, when conflicts or issues are found, those conflicts/issues may be reported to users, administrators, or be automatically resolved. The duplicate checking process can use past results to determine the likely result of any conflict. For instance, if the street name was misspelled but otherwise matches, and the email address is exact, that might be a case where you will most likely merge the two records. The system can present the classes of issues and make recommendations to allow for bulk resolution of any issues.

The system may also provide the ability to use non-exact matches for determining the existence of duplicate records. One type of system that would help provide non-exact matches is an algorithm or service that provides address normalization. Common misspellings of streets (main, mian), interchanged road types (st., street, str., ST., Street, . . . ) can be abstracted away and/or normalized. Once these records are processed and a more common representation of the data is achieved, then the more common representation can be used to perform duplicate checks.

The duplicate checks are typically run against similar kinds of objects. For instance, if a user is importing a lead (a type of person that has not yet started the purchasing process), then the duplicate checking system should check all people objects for duplicates. If the user imports a lead that is already in the system as a contact, the duplicate should be found. The system works on similar data types and similar object types. An email address, for instance, can be checked against any email address in the system, and not just the email address of a contact.

The system may also permit integration of a forum-based discussion format into the system wherein the threaded discussions may be categorized and/or tied to specific business objects and thus provide a natural mechanism for users to collaborate with each other and allow for that collaboration to be naturally captured in the system. The system may support one or more forum topics wherein each topic is intended to be a discrete category of discussion with examples including collections of knowledge, recent news announcements, and interactive dialog when diagnosing a problem and preparing a customer response. For forum discussion threads that are tied to one or more business objects, the threads may be displayed in the user interface under or associated with that business object and thus allow users to quickly see what discussions are available for a particular topic/object.

The system may also support offline clients wherein each offline client is a partial local copy of the system that is typically installed on a portable machine or a machine in a remote office. Once the offline client is created, changes and updates to the master system can be synced with the offline client. The offline client can be used, for example, as a hot backup for the production system leveraging regular synching or it can be used by traveling employees. The offline client may be created with a single download that may install some or all of the basic system requirements (database, web server, PHP application) and install the Sugar software application. The installation process may be integrated to be able to automatically drive the entire install from one user interface or from configuration files. Thus, a one step procedure may install and configure the database, web server and PHP stack, install and convert the Sugar offline client and pre-populate the user data. This "convert" process involves logging into the main system to authenticate, and then pulling down the appropriate user's data from the main server. When new upgrades are applied to the server, the offline clients can be automatically upgraded. This will apply any logic, database, or code updates without any user intervention or expertise. When data changes are transmitted between the server and offline client, batch transfers and inserts may be used to speed up the process. If there are too many changes coming from the server side down to the client, the entire row, table, or database may be re-transmitted. If the sync fails for any reason, it can be resumed where it left off.

For each offline client, the detection of what files have changed and need to be updated can leverage file modification time, file creation time, file MD5s, or any known mechanisms. Once the file list is built, the system may compress the files that need to be transmitted into one or more packages in order to make the transfer more efficient. After a sync has taken place, the system may present the user a list of what is new or has changed which will help the user keep up to date with the current information in their system. During the sync process, the system may change compression settings or change what is synced based on the bandwidth between the offline client and the server. If the bandwidth is low, the system might allow a user to perform large syncs later or schedule them at night when the server can take more time to process the sync request and network congestion is decreased. If the server should become unavailable during this time for a maintenance window, the offline client should automatically enter a holding pattern and retry later until the server becomes available again.

Figure 8:
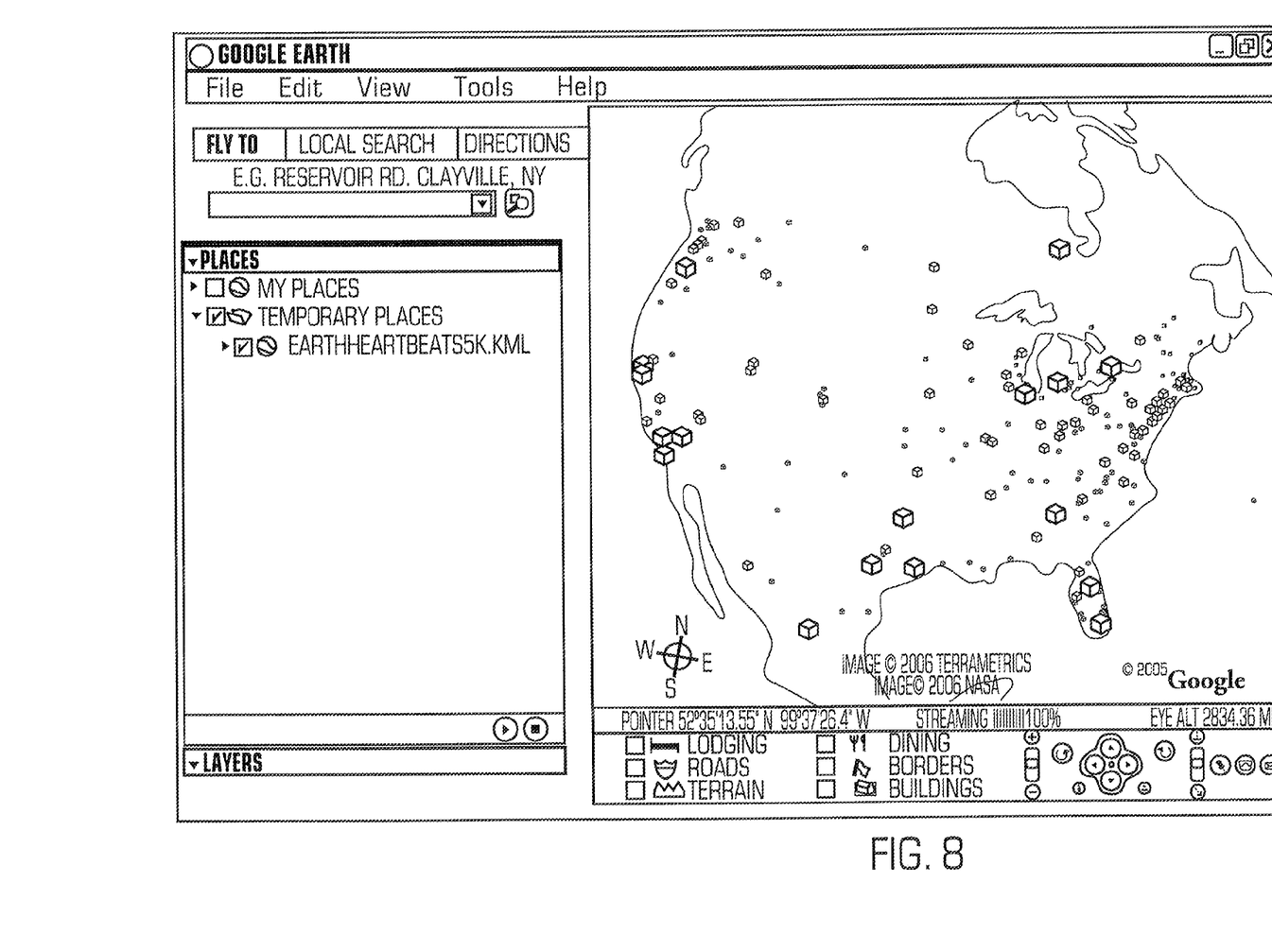
FIG. 8 illustrates an example of the user interface for sugarPlanet.

The system may also include Sugar Planet which is a system to map data from the CRM system or other business systems into a real world representation of that data as shown in FIG. 8. Sugar Planet may be implemented as a mapping module that is part of the modules of the system shown in FIGS. 1A and 1B and comprises a plurality of lines of computer code that, when executed by a processor, implement the mapping operations as described below. An example of the mapping is the mapping/plotting geographical data (such as addresses) onto a globe or a map so that the system provides the ability to visually map the locations of various Sugar objects such as Account business locations, and Lead and Contact addresses onto a map which is useful for optimizing account visits and for territory planning and management. There are many kinds of data that can be mapped using this mechanism including address information, usage and/or activity information that can be represented on the map or globe. A set of indicators on the map may be modified to indicate the appropriate level of activity so that, for example, larger icons, vertical spikes, or color coding (among other options) may be used to show activity levels. For example, as shown in FIG. 8 (which shows indicators placed onto the Google Earth program), an indicator 190 may increase in size based on the activity in the particular location. Some of the many types of activities on which this could be used include responses to marketing campaigns, website traffic, incoming leads, product usage, product issues, customer sites, lead sites, and amount of product purchased.

Using SugarPlanet and data stored in system, users of the system can quickly map individual or sets of addresses from Accounts, Leads and Contacts, depicting their locations in a mapping program such as Google Earth. Using web site logs, server side logs, inbound email server information, customers can quickly get a latitude and longitude for the registered address of the server and render it on the map. If a company where to have a product that can periodically send anonymous data to the company, the source of that data can be tracked in Sugar to help understand usage patterns. The system is able to convert-an IP address to a physical address or a geocode which is then plotted against a mapping tool such as Google Earth. The maps and globes can be rendered to show multiple types of data simultaneously and the mapping information may be packaged in a portable format that can be transmitted between users so that users can then select what types of data they would like to see in their map or globe.

In one embodiment, translation data for IP address to physical address to geocode would be cached by the server to decrease the number of requests for geocode information. Existing addresses could be presented without any external input. Periodic refreshes can be utilized to ensure that the cache remains up to date and contains only valid information. The system may also allow for data abstraction at different levels so that, if you wanted to see usage by country for instance, all addresses could be mapped to a country with only one data point per country.

The system may also prevent time based data in slices to the map. In cases where data is time sensitive multiple time based views can be produced. In one view, incremental activity is added to the map. An example of this kind of view would be showing all of the cumulative sales during a quarter by week. As the quarter progresses, more and more deals will be on the map. This data can be presented as incremental views with short updates per view. Another kind of view is a projection of current activity through time. A graph of usage data for a Sugar installation, for instance, can take hourly snapshots of current usage and then present them to the map. Each slice would show who was active at a particular time, and these slices combined show usage trends over time.

While the foregoing has been with reference to a particular embodiment of the system and method, it will be appreciated by those skilled in the art that changes in this embodiment may be made without departing from the principles and spirit of the system, the scope of which is defined by the appended claims.

The invention claimed is:

1. A customer relationship management system, comprising:
   a client;
   a database containing a plurality of pieces of information;
   one or more modules that access the database to pull pieces of information from the database based on a request from the client and display a user interface to the user containing the requested information;
   one or more controllers that control access by the client to the one or more modules and the database;
   a sugarbean class wherein each module further comprises a subclass of the sugarbean class; and
   wherein the one or more modules further comprises a forecasts module that generates a forecasts home page to set, manage and update quotas and forecasts.

2. The system of claim 1, wherein the forecasts home page further comprises means for assigning quotas to a sales representative for a predetermined time period.

3. The system of claim 1, wherein the forecasts home page further comprises means for analyzing historical quota and forecasts.

4. The system of claim 1, wherein the forecasts time periods are configurable and multiple hierarchical and/or overlapping time periods are supported for quotas and forecasts.

* * * * *